Aug. 10, 1965   R. K. MATUSCHKOVITZ   3,199,975
DESULFURIZATION OF IRON
Filed Oct. 30, 1962   2 Sheets-Sheet 1

INVENTOR.
RICHARD K. MATUSCHKOVITZ

BY *Wason, Kolehmainen,*
*Rathburn & Wyss.*

ATTORNEYS

INVENTOR.
RICHARD K. MATUSCHKOVITZ

ATTORNEYS

United States Patent Office 3,199,975
Patented Aug. 10, 1965

3,199,975
DESULFURIZATION OF IRON
Richard K. Matuschkovitz, Chicago, Ill., assignor to Chemetron Corporation, Chicago, Ill., a corporation of Delaware
Filed Oct. 30, 1962, Ser. No. 234,020
3 Claims. (Cl. 75—43)

This invention relates to a method for reducing sulfur content of iron in a cupola furnace. More particularly, this invention relates to a method of refining iron by the intermittent addition of calcium carbide in a stream of inert gas injected below the surface of the molten iron in the cupola well during operation of the cupola.

Shaft furnaces, such as cupolas, have been used for the production of cast iron by melting pig iron, scrap iron and steel with fluxing materials, the heat being supplied by the combustion of coke with air blown into the cupola through tuyeres. In ordinary practice the cupola is first filled with coke to some distance above the tuyere level and this coke is ignited and burnt in. When the coke is white hot, charging begins and the melting operation is started. Layers of limestone and pig iron and scrap iron and steel are placed above the coke bed with alternative layers of coke to replace the coke which burns out during the operation. As the iron charge descends in the cupola, the metal becomes soft and finally melts in the melting zone which is the hottest zone immediately above the tuyere level. Liquid superheated iron flows around the coke pieces in the coke bed and is collected in the well of the cupola from where it is tapped through the tap hole.

The Carter Patent No. 2,643,185 discloses that the addition of a relatively small amount of calcium carbide to the cupola charge is effective in reducing the sulfur content of the iron. The Timmerbeil et al. Patent No. 2,865,735 discloses an improvement whereby calcium carbide whose melting point is lower than 1800° C. is introduced into the cupola as part of the charge. These techniques have produced substantial improvements in the desulfurization of iron but they have certain inherent disadvantages, one of which is that the procedure is not effective until several charges have been passed through the cupola. Furthermore, the calcium carbide reacts with the iron in the melting zone of the cupola and part of the calcium carbide is oxidized and creates heat which increases the melting zone temperature, which results in a higher carbon pickup and higher melting rate. In addition, the contact between the molten iron and the calcium carbide in the melting zone and above is somewhat inefficient with the result that the molten iron is not efficiently desulfurized.

It is the object of this invention to provide an efficient method for desulfurizing iron. It is a further object of this invention to provide a method for efficiently desulfurizing iron with calcium carbide which is immediately effective with the first charge. These and other objects are apparent from and are achieved in accordance with the following disclosure.

In accordance with the present invention, it has been discovered that iron can be efficiently desulfurized by reaction with a stream of inert gas containing powdered calcium carbide suspended therein injected into the molten metal in the well of the cupola. The calcium carbide is preferably introduced on an intermittent basis with short injection periods, generally less than one minute in duration. The calcium carbide is dispersed effectively throughout the molten metal in the vicinity of the inlet for the gas and calcium carbide into the cupola. The calcium carbide is efficiently contacted with the molten metal and is highly effective in desulfurizing the iron. The reaction between the sulfur in the molten metal and the calcium carbide takes place rapidly at the temperature of the molten iron which has descended through the heating zone of the cupola and is at a temperature in the range of 2650–3100° F. The procedure is effective in desulfurizing the first charge of iron melted in the cupola and continues throughout the entire cupola run. The procedure can be applied to intermittently tapped cupolas or continuously tapped cupolas so long as the gas stream bearing the calcium carbide is introduced into the molten metal below the surface thereof.

The invention can perhaps be best understood by reference to the attached drawings wherein.

Figure 1:
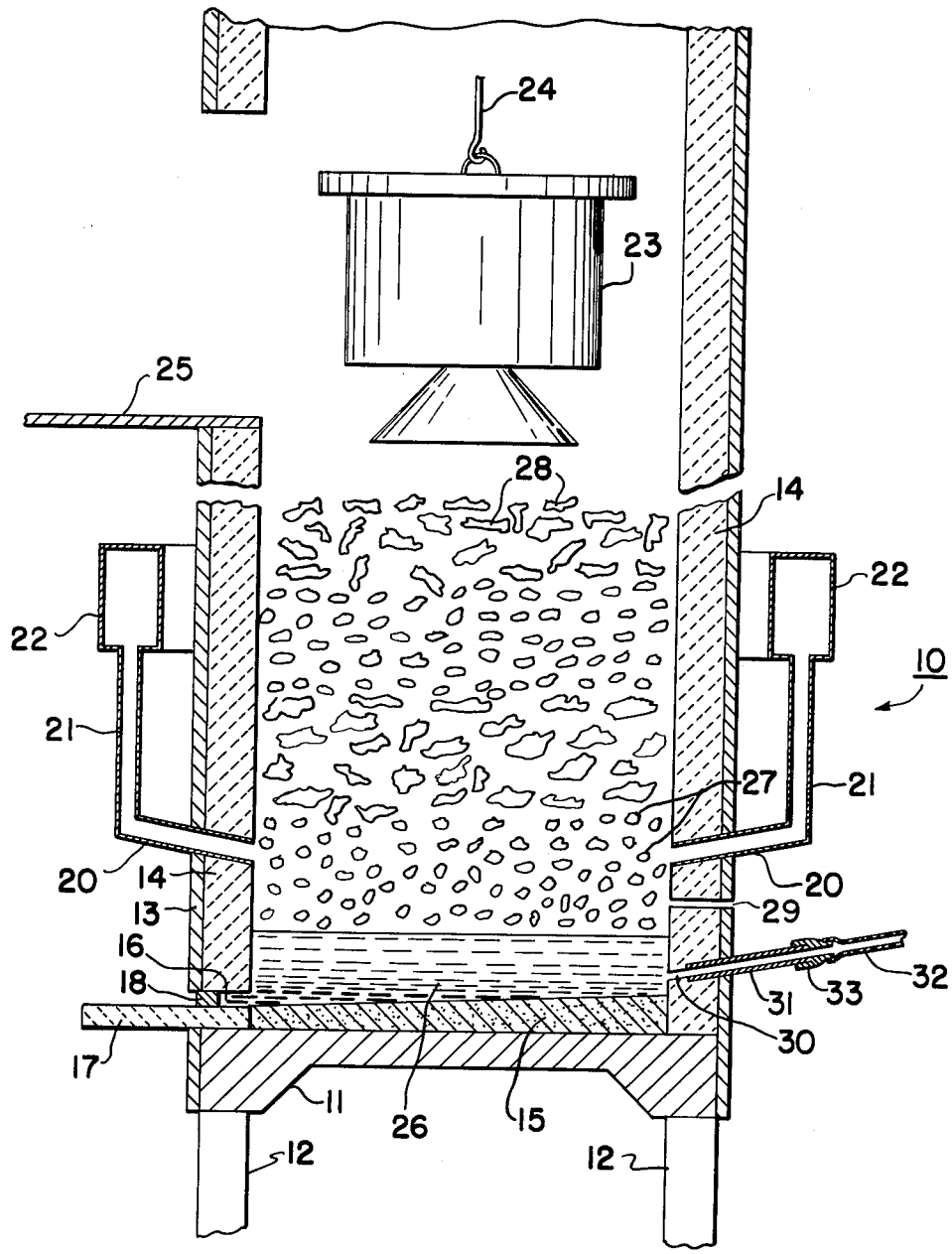
FIG. 1 represents a cross sectional view of an intermittently tapped cupola provided with a gas injection tube for use in the operation of this invention.

Turning to FIG. 1, a cupola furnace generally indicated by 10 is provided with a supporting base 11 and legs 12. On the supporting base 11 is a cylindrical steel shell 13 which is lined with a refractory acid or basic lining 14. On the supporting base 11 is a sand bottom 15 which is inclined slightly toward the tap hole 16 from which molten iron is withdrawn over a refractory lip 17. As illustrated in FIG. 1, the tap hole 16 is plugged with a clay plug 18. The cupola 10 is provided with tuyeres 20 conected to piping 21 leading to the annular tuyere box or windbox 22 which surrounds the cupola. Near the top of the cupola is a bucket 23 suitably supported from a crane (not shown) by a wire rope 24. The charging bucket 23 is adapted to move into and out of the cupola by way of an opening in the cupola wall above the charging floor 25. As shown in FIG. 1 the cupola 20 has a pool of molten iron 26 in the cupola well below the tuyeres 20. The cupola is charged with coke 27 and scrap iron 28. The heat of combustion of the coke in the air blast provided by the tuyeres 20 melts the iron scrap 28 and the molten iron descends the cupola to the molten iron pool 26. Near the bottom of the cupola above the sand bottom 15 there are one or more inlet ports 30 through part of the refractory lining 14. An inlet tube 31, preferably of graphite or other refractory material, although steel tubing is adequate, is inserted through the steel shell 13 and part of the refractory lining 14, where it connects to the inlet port 30. It is preferably fitted snugly to the steel shell 13 and cemented into the refractory lining with refractory cement. The inlet tube 31 is affixed to a rubber hose or other suitable flexible tubing 32 by means of a nipple or other fitting 33.

In the operation of this invention a stream of nitrogen or other inert gas is injected via the rubber hose 32, the nipple 33 and the inlet tube 31 and the port 30 into the molten metal beneath the surface thereof. Powdered calcium carbide is injected into the gas stream intermittently and carried with the gas stream into the molten metal 26.

Figure 2:
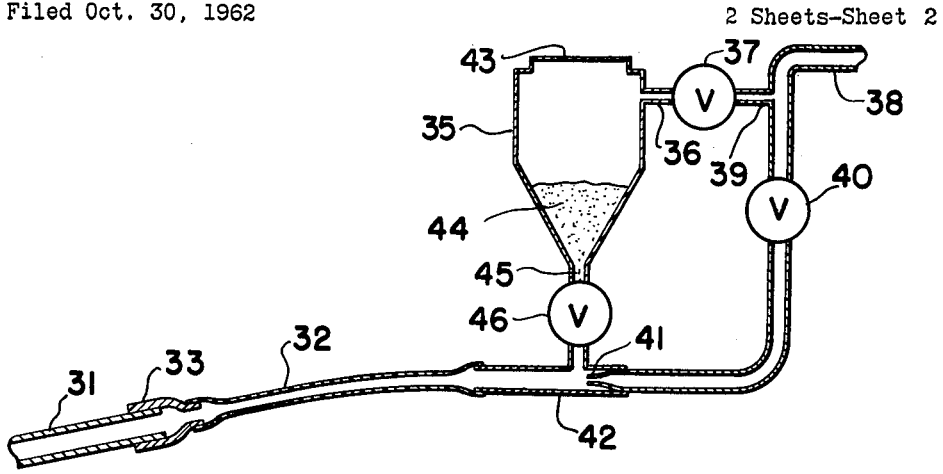
FIG. 2 represents a cross sectional view of a calcium carbide injection device.

FIG. 2 illustrates the calcium carbide injection system which is conveniently used in this invention. It includes a hopper 35 in which powdered calcium carbide is stored. A supply of nitrogen or other inert gas under pressure is provided to the hopper 35 by way of a line 36 which is equipped with a regulator valve 37 for adjusting the pressure of the gas stream within the hopper 35. The supply of inert gas, under pressure of 50–100 pounds per square inch, is provided to the apparatus by a line 38 which has a T 39 connected to the line 36 to provide gas to the hopper. The line 38 proceeds beyond the T 39 through a pressure control valve 40 to a venturi tube 41 which is disposed within a T 42 at the bottom of the hopper 35. The bottom of the hopper 35 is connected with a conduit 45 equipped with a regulating valve 46 to control the rate of flow of the powdered calcium carbide out of the hopper 35. As the powdered calcium carbide enters the T 42, it is entrained in the stream of inert gas passing through the venturi tube 41 and the stream of gas and entrained calcium carbide passes out of the T 42 by way of the flexible tube 32 which connects with the inlet tube 31 and leads the stream of gas and calcium carbide into the cupola well below the surface of the molten metal.

Figure 3:
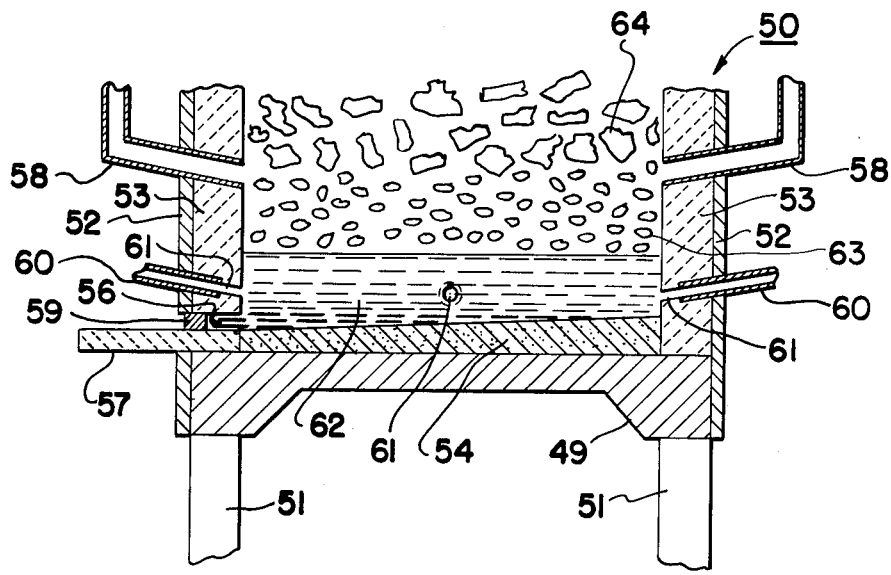
FIG. 3 represents a cross sectional view of the well of a continuously tapped cupola arranged for operation of this invention.

FIG. 3 illustrates the invention as operated in a continuously tapped cupola 50. This cupola is supported on a base 49 which is affixed to legs 51 and contains a shell 52 provided with a refractory lining 53. A sand bottom 54 is packed firmly on the cupola base 49 and is inclined slightly to the tap hole 56, shown closed with a clay plug 59, above the refractory spout 57. The cupola is equipped with tuyeres 58 and in other respects is a complete cupola furnace. Inlet tubes 60 of graphite or other refractory material are snugly fitted through the cupola shell 52 and extend part way into the refractory lining 53. They connect with ports 61 in the refractory lining which lead into the cupola well. The ports 61 are so arranged as to be below the level of the molten iron pool 62 which collects in the cupola well below the charge of coke 63 and scrap iron 64. The stream of inert gas is passed continuously through the inlet tubes 60 and the ports 61 into and beneath the surface of the molten metal 62, and the powdered calcium carbide is injected intermittently into the stream of inert gas and thus carried into the molten metal pool 62.

In the cupolas 10 and 50, the inlet tubes 31 and 60, respectively, are so located that they terminate approximately 1½ to 2 inches from the inside of the refractory lining. Thus they are removed from the molten metal and are protected from disintegration under the temperature of the operation. During the lining of the cupola before operation, the tubes 31 and 60 which extend through the shell of the cupola are preferably plugged with a cylindrical plug of approximately the same internal diameter as the tubes 31 and 60. Then the lining is applied to the inside of the cupola to the thickness desired and the plugs are removed from the tubes 31 and 60, thereby providing inlet ports 30 and 61. These ports can also be prepared by applying refractory cement around cylindrical plugs in the tubes 31 and 60. This is the preferred method when part of the refractory lining has been eroded away during operation of the cupola.

The inert gas which is injected into the metal pool in the cupola can be nitrogen or a monatomic gas such as argon or helium. In certain cases, it can be chlorine or mixtures of nitrogen and chlorine. The gas is supplied to the calcium carbide dispensing unit as illustrated in FIG. 2 at a pressure of 50–100 p.s.i.g. The pressure of the inert gas in the hopper 35 is preferably in the range of 5–10 pounds per square inch. The pressure of the gas stream as it enters the flexible hose or tubing 32 is in the range of 15–40 pounds per square inch. This pressure can be regulated in relation to the ferrostatic head within the cupola above the inlet ports 30 or 61. The ferrostatic head can in some cases be 12 to 15 inches. In such cases, gas pressures of 15–40 p.s.i.g. are adequate.

The stream of inert gas is continuously passed into the cupola via the inlet tubes 31 or 60 and the ports 30 or 61. This prevents plugging of the inlet ports with solidified iron or with slag. The continuous stream of gas also has the advantageous effect of cleaning the iron by flushing out gases contained therein such as oxygen and hydrogen and improves the structure of the iron by causing oxides to float to the surface where they are removed as slag. The gas stream has the effect of changing the surface tension of the molten metal, which aids in the removal of gases and slag. In addition, it has a beneficial effect on the graphite which is formed in the iron and induces the formation of type A graphite. It also improves the matrix of the iron produced.

The desulfurization which occurs in the cupola well by reaction with the finely divided calcium carbide in the stream of inert gas is far superior to the post-cupola carbide injection procedure because in the latter the calcium carbide, due to its low density, floats to the top of the iron where it is admixed with slag and is in contact with the metal and the sulfur therein for only a short period of time. Often only a surface melting reaction of the calcium carbide takes place and the desulfurizing effect is low.

In the present invention the desulfurization is more effective than that obtained by adding calcium carbide to the cupola charge because in that procedure the contact between molten metal and calcium carbide is transistory and incomplete. Furthermore, part of the calcium carbide is oxidized in the melting zone above the tuyeres and is lost. In the present procedure, however, the calcium carbide is completely contacted with the iron and the desulfurization effect is much greater than in prior procedures. Furthermore, the introduction of calcium carbide to the molten iron can be continued over the entire operation of the cupola. It is also possible to carefully control the amount of calcium carbide injected into the molten metal so as to obtain the maximum desulfurization efficiency.

The procedure of this invention can be applied to molten iron in both intermittently tapped cupolas and continuously tapped cupolas. In intermittently tapped cupolas the iron is drawn off from time to time (e.g., every five to ten minutes) and the depth of the pool of molten iron varies. Just after tapping, the pool is at its minimum depth and may be below the inlet for the stream of inert gas containing the calcium carbide. During the period when the molten metal is below the inlet only the stream of inert gas is passed in. As the molten metal accumulates in the well of the cupola and covers the inlet for the inert gas, the introduction of powdered calcium carbide on an intermittent basis is commenced. If desired, the carbide can be injected on a continuous basis at a lower rate. The carbide injection is continued until the height of the molten metal pool reaches the slag hole 29 at which time slag begins to run off. At this point the cupola is again tapped and the metal pool is reduced to its lowest level.

With continuously tapped cupolas the molten metal is drawn off at approximately the rate in which it is melted down in the cupola and the depth of the melt in the cupola well is approximately constant. In such cupolas it is important that the inlet ports through which the stream of inert gas bearing the powdered calcium carbide is introduced, be at a level below the minimum height of the pool of molten metal, thereby providing for the introduction of the inert gas stream below the surface of the molten metal at all times. The introduction of powdered calcium carbide into the inert gas stream is preferably done on an intermittent basis to achieve maximum dispersion of the calcium carbide in the molten iron and improve the efficiency of the operation. With both types of cupolas, it is important that the gas stream be passed continuously into the cupola in order to prevent plugging of the inlet with metal or slag. It is advantageous to have several inlets into the cupola well to achieve maximum distribution of the calcium carbide throughout the molten metal. Ordinarily about four inlets placed symmetrically around the circumference of the cupola below the level of the molten metal are desirable.

In the operation of the procedure of this invention, a flow rate of approximately 6 to 8 cubic feet of inert gas per minute at a pressure in the range of 15 to 30 p.s.i.g. through each port is desirable, although flow rates of 5 to 15 cubic feet per minute are satisfactory. Calcium carbide in powdered form (14 mesh or finer) is injected into the gas stream for short periods of time and carried by the gas stream into the molten iron. Ordinarily 5 to 10 pounds of calcium carbide per ton of iron is used in order to achieve satisfactory desulfurization. Two pounds of calcium carbide is equivalent to one pound of sulfur contained in the molten iron but ordinarily excesses of 50–100% are used. Generally about 8 to 10 pounds of calcium carbide are used per pound of sulfur removed from the iron. Ordinarily injection periods of 5–15 seconds are adequate, with periods of 5–15 seconds between injections. However, injection periods up to one minute in duration with periods up to one minute between injections are satisfactory. The total time of the periods of injection is controlled by the rate of injection of the calcium carbide so that the appropriate amount of calcium carbide is injected into each pool of molten iron between tappings. Ordinarily the total injection time is in the range of one to three minutes per ton of iron.

By this procedure, it is generally possible to reduce the sulfur content of the molten iron in the cupola to about 50% of its normal value in periods of 5 to 10 minutes. In accordance with this invention, the iron is efficiently desulfurized during the melting operation in the cupola. This eliminates the post-furnace treatment, thereby reducing time of the operation and avoiding cooling of the metal in the ladle. Furthermore, the desulfurization operation is more efficient by injecting the calcium carbide into the molten metal in the cupola because the iron must go through the area in which the calcium carbide is injected in order to be tapped out of the cupola, whereas in ladle desulfurization the calcium carbide floats to the top of the molten iron and is inefficiently contacted with the iron. The loss of calcium carbide by floating to the surface does not occur to any significant extent in the cupola and all the calcium carbide remains in intimate contact with the molten iron in the cupola well.

The invention is illustrated in further detail by means of the following operating example. It will be understood by those skilled in the art that various modifications of operating conditions can be made within the disclosure of this specification without departing from the invention.

Example I

A number 3 acid-lined cupola furnace was charged with subsequent charges each consisting of 150 pounds of pig iron, 200 pounds of scrap return, 140 pounds of scrap iron, 50 pounds of scrap steel, 65 pounds of coke and 15 pounds of limestone. Prior to charging the furnace, the coke bed was ignited in its normal way and the coke bed was burnt in. Then normal cupola practice was followed thereafter.

The cupola was equipped with four graphite inlet tubes of one-half inch inside diameter and approximately 2 inches outside diameter. The graphite tubes were fitted closely into holes in the cupola shell and extended partway through the refractory lining of the cupola. The graphite tubes connected to holes in the lining of one-half inch diameter and about one and one-half inches in length which lead to the cupola well. The calcium carbide (14 mesh) was injected at a rate of approximately 7 pounds per ton of iron intermittently, with ten seconds' injection and ten seconds between injections.

Molten iron was tapped intermittently in the transfer ladle of about 750 pounds capacity and this iron was then poured into smaller pouring ladles. Metal from the first tap was used to preheat the ladles and was then pigged. Metal from the succeeding taps was poured into molds which produced castings. The following results were obtained:

| Time After Tap 1 (Min.) | Tap No. | Percent S |
|---|---|---|
|  | 1 | .065 |
| 17 | 2 | .046 |
| 28 | 3 | .042 |
| 41 | 4 | .040 |
| 52 | 5 | .042 |
| 61 | 6 | .045 |
| 71 | 7 | .046 |
| 81 | 8 | .047 |
| 87 | 9 | .048 |
| 99 | 10 | .046 |
| Average |  | .044 |

The iron produced in normal cupola operation without calcium carbide injection had an average sulfur content of 0.075%. From the foregoing data, it is seen that the sulfur content of the base iron as tapped was decreased from 0.075% to 0.044% on the average.

I claim:

1. Method of desulfurizing iron which comprises injecting eight to ten pounds of powdered calcium carbide per pound of sulfur removed from the iron intermittently into molten iron below the surface thereof in a continuous stream of inert gas through a series of peripheral ports in the well of a cupola while said molten iron is in the well of said cupola.

2. Method of claim 1 wherein the inert gas is nitrogen at a flow rate in the range of 5 to 15 cubic feet per minute.

3. Method of claim 2 wherein the powdered calcium carbide is injected intermittently into the nitrogen stream for periods of 5 to 60 seconds, with periods of 5 to 60 seconds between injection periods.

References Cited by the Examiner

UNITED STATES PATENTS

| 1,977,428 | 10/34 | Cromwell | 75—130 |
| 2,577,764 | 12/51 | Hulme | 75—58 |
| 2,803,533 | 8/57 | Bieniosek et al. | 75—53 |
| 2,855,336 | 10/58 | Curry | 75—130 |
| 2,870,004 | 1/59 | Estes | 75—51 |
| 2,918,365 | 12/59 | Kanamori et al. | 75—53 |
| 2,963,364 | 12/60 | Crockett et al. | 75—58 |

BENJAMIN HENKIN, *Primary Examiner.*